Patented July 9, 1940

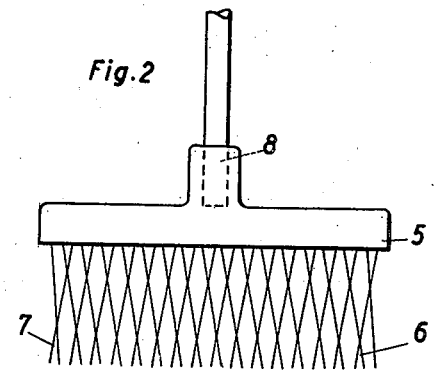
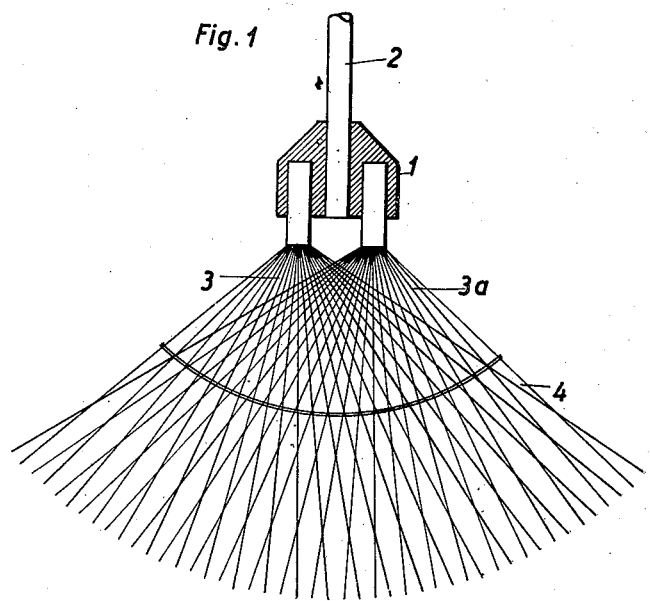

2,207,488

UNITED STATES PATENT OFFICE 2,207,488

LEAF RAKE

August Laemmlin, St. Gall, Switzerland

Application October 13, 1938, Serial No. 234,855
In Switzerland September 10, 1938

2 Claims. (Cl. 56—400.17)

My invention relates to improvements in leaf rakes which comprise springy metal wires or strips in a fan-shaped disposition, and the principal object of my improvements is to make provision for preventing the leaves from slipping through the rake when operating the latter. I attain this object by the leaf rakes illustrated, by way of examples, in the accompanying drawing, in which—

Fig. 1 shows a rake with fan-shaped disposition of the rake elements proper; and Fig. 2, a rake with oblique disposition of the rake elements proper.

In the holder or base 1 (Fig. 1) a hole for the handle 2 and holes for the fan-like spreading wire-bundles or strip-groups 3 and 3a are provided, wherein the latter are fastened. The wires 4 of the said groups 3 and 3a are mesh-like interwoven. That is to say, each wire or strip of group 3, except the outer strip at each side of said group, successively passes under and over a plurality of the wires or strips 4 of group 3a. The outer strips aforesaid each cross the adjacent outer strip of group 3a, and vice versa. As a result of this interweaving, not only is a mesh-like structure achieved which prevents the passage of leaves and the like through the rake, but the interwoven wires or strips mutually support each other to provide a relatively strong structure. At the same time, one end of each wire is anchored in the base member.

Fig. 2 shows, by way of an example, a form of invention in which the wires are disposed in such a way that they intercross and are interwoven with each other. In the holder or base 5 a series of wires 6 are run toward the right, and a series of wires 7 toward the left. The wires 6 and 7 are interwoven as are the wires of groups 3 and 3a of Fig. 1. As in the first form of the invention, a mesh-like structure is achieved wherein the interwoven wires or strips mutually support each other. The holder 5 is provided with an opening 8 for the handle.

The said wires may be made of any suitable springy material and may be of any cross-section desired.

What I claim and desire to secure by Letters Patent is:

1. A leaf rake of the class described, comprising a base member, a group of strips anchored to said base and extending therefrom in one diagonal direction, a second group of strips also anchored to said base and extending therefrom in an opposite diagonal direction whereby substantially every strip of each group crosses a plurality of strips of the other group, and said strips of one group alternately passing under and over alternate strips of the other group and vice versa to interweave said groups and provide a unitary mesh-like structure, the free ends of both groups of strips extending outwardly of said mesh-like structure to provide rake teeth.

2. The structure of claim 1, each group of strips lying in substantially the same plane to provide a flat rake.

AUGUST LAEMMLIN.